United States Patent [19]
Gamay

[11] Patent Number: 5,080,913
[45] Date of Patent: Jan. 14, 1992

[54] PROCESS FOR PREPARING LOW FAT CHEESE

[75] Inventor: Aly Gamay, Franklin, Wis.

[73] Assignee: Alpine Lace Brands, Inc., Maplewood, N.J.

[21] Appl. No.: 522,527

[22] Filed: May 11, 1990

[51] Int. Cl.⁵ .................. A23C 19/032; A23C 19/06; A23C 19/09; A23C 19/14
[52] U.S. Cl. .......................... 426/39; 426/40; 426/42; 426/522; 426/582
[58] Field of Search .................. 426/34–40, 426/42, 43, 49, 522, 580–583, 585, 586, 804

[56] References Cited

U.S. PATENT DOCUMENTS

| | | |
|---|---|---|
| 3,780,182 | 12/1973 | Johnson et al. |
| 3,840,672 | 10/1974 | Kasik et al. |
| 3,873,729 | 3/1975 | Kubota et al. |
| 3,882,250 | 5/1975 | Loter et al. |
| 3,922,376 | 11/1975 | Strinning et al. |
| 3,929,892 | 12/1975 | Hynes et al. |
| 3,953,610 | 4/1976 | Little |
| 3,961,077 | 6/1976 | Kielsmeier |
| 3,969,534 | 12/1976 | Pavey et al. |
| 3,975,544 | 8/1976 | Kosikowski |
| 4,000,332 | 12/1976 | Strinning et al. |
| 4,020,185 | 4/1977 | Andersen et al. |
| 4,066,800 | 1/1978 | Rosenau et al. |
| 4,085,228 | 4/1978 | Reinbold et al. |
| 4,133,895 | 1/1979 | Kosikowski et al. |
| 4,169,160 | 9/1979 | Wingerd et al. |
| 4,169,854 | 10/1979 | Igoe |
| 4,177,293 | 12/1979 | Forman et al. |
| 4,244,983 | 1/1981 | Baker |
| 4,277,503 | 7/1981 | Bily |
| 4,288,459 | 9/1981 | Baker |
| 4,318,928 | 3/1982 | Sing |
| 4,362,749 | 12/1982 | Sozzi |
| 4,366,174 | 12/1982 | Kneubuehl et al. .......... 426/36 |
| 4,379,175 | 4/1983 | Baker |
| 4,410,549 | 10/1983 | Baker |
| 4,416,905 | 11/1983 | Lundstedt et al. |
| 4,434,184 | 2/1984 | Kharrazi |
| 4,459,313 | 7/1984 | Swanson et al. |
| 4,476,143 | 10/1984 | Czulak et al. ............. 426/40 |
| 4,534,982 | 8/1985 | Yoshida et al. |
| 4,547,385 | 10/1985 | Lindstam |
| 4,568,555 | 2/1986 | Spanier |
| 4,581,240 | 4/1986 | Smith |
| 4,631,196 | 12/1986 | Zeller |
| 4,684,533 | 8/1987 | Kratochvil |
| 4,713,254 | 12/1987 | Childs et al. |
| 4,719,113 | 1/1988 | Kharrazi |
| 4,719,118 | 1/1988 | Thomas |
| 4,724,152 | 2/1988 | Baker et al. |
| 4,732,769 | 3/1988 | Sozzi et al. |
| 4,749,584 | 6/1988 | Wirchansky et al. .............. 426/582 |
| 4,806,479 | 2/1989 | Kegel et al. |
| 4,837,035 | 6/1989 | Baker et al. |
| 4,837,036 | 6/1989 | Baker et al. |
| 4,851,243 | 7/1989 | Andersen et al. |
| 4,906,481 | 3/1990 | Bussiere et al. |
| 4,917,905 | 4/1990 | Guy et al. |
| 4,919,944 | 4/1990 | Bussiere et al. |

FOREIGN PATENT DOCUMENTS

| | | |
|---|---|---|
| 834092 | 2/1970 | Canada |
| 1248407 | 1/1987 | Canada |
| 187831 | 7/1985 | European Pat. Off. |
| 1374094 | 9/1971 | United Kingdom |
| 2106366A | 9/1982 | United Kingdom |
| 2214776A | 6/1988 | United Kingdom |

OTHER PUBLICATIONS

"Evaluation of Alternative Methods to Increase Calcium Retention in Cottage Cheese Curd", M. A. Craddock & C. V. Moor, *Journal of Food Science* (1988), vol. 53, No. 6, pp. 1680–1683.

"Effect of Enzyme Treatment and Ultrafiltration on the Quality of Lowfat Cheddar Cheese", J. U. McGregor & C. H. White, *Journal of Dairy Science* (1990), vol. 73, No. 3, pp. 571–578.

"Innovative Cottage Cheese Manufacturing Processes", Gerald W. Smith, *Cultured Dairy Products Journal* (Nov. 1983), pp. 22–23.

"An Attempt to Produce Low Fat Cephalotyre (Ras) Cheese of Acceptable Quality", A. A. El-Neshawy, A. A. Abdel Baky, A. M. Rabie & M. M. Ashour, *Food Chemistry* (1986), vol. 22, pp. 123–127.

*Primary Examiner*—Arthur L. Corbin
*Attorney, Agent, or Firm*—Reinhart, Boerner

[57] ABSTRACT

A method for making low fat cheese wherein liquid milk having a fat content of 0% to 0.3% is mixed with carrageenan and then a lactic acid produce is added to the mixture to form a cheese formulation solution. A clotting enzyme, e.g. rennet, is added to the solution and the solution is then coagulated to form a curd and a whey solution. The curd is cut and the whey solution separated therefrom, water is added to the curd and then separated therefrom and finally the curd is ripened to form a low fat cheese having a fat content arising from the fat content of the starting milk.

21 Claims, No Drawings

PROCESS FOR PREPARING LOW FAT CHEESE

BACKGROUND OF THE INVENTION

The present invention is related generally to a method and article of manufacture of low fat, low cholesterol and low calorie cheese. More particularly, the invention is related to a method and article of manufacture of low fat, low cholesterol natural cheeses employing selected amounts of carrageenan and lactic acid producing bacteria for producing the cheese product.

The general public has become increasingly aware of the need to control the intake of fats and cholesterol in their diets. Dairy products, particularly cheese products are regarded as a significant source of saturated fats and cholesterol. Medical studies have concluded that human consumption of such fats and cholesterol should be limited in order to avoid such maladies as coronary heart disease. The general recommendation has thus been to greatly reduce and even eliminate consumption of cheese which is a concentrated source of such detrimental, unhealthy fats and cholesterol. This recommendation is rapidly becoming accepted by the public and is resulting in substantial decrease in the consumption of cheese food products. Substantial efforts have been mounted over about the past ten years to discover a method and article of manufacture of low fat, low cholesterol cheese with the flavor and texture of normal cheese. It has been determined that the presence of fat is important in obtaining the right body and texture of the finished cheese, and the fat also has an important role in the flavor of the product. All of these features affect consumer acceptability of the product. As stated by the cheese expert Kosikowski in his textbook on cheesemaking, *Cheese and Fermented Milk Foods*, F. V. Kosikowski and Associates, Brooktondale, New York, 1978 2nd ed.:

In this diet and calorie conscious era, skim milk cheddar cheese would appear to be destined for greater popularity, but the fact is that the cheese has no appetizing characteristics. It is without much cheese flavor and body texture is usually as hard as rock. Rapid drying out of the cheese during cooking is a characteristic feature, despite the normal low cooking temperatures of 31° C. (Kosikowski, p. 242)

An example of one attempt to produce a moderate fat content cheese is set forth in U.S. Pat. No. 4,476,143. This patent is directed to a method which uses a method of producing a moderate level fat cheese product using a starting liquid milk having a fat content between 0.3 and 1.5%. These fat levels in a final cheese product will be about ten to twelve times the fat content of the starting liquid milk. The starting liquid milk was inoculated with a culture of Lactobacillus bulgaricus, Streptococcus thermophilus and with a culture of Lactobacillus casei, in addition to a normal cheese starter culture. Synersis of the curd is impeded by the addition of a monovalent cation, such as sodium in the form of sodium chloride. Further, the addition of the indicated amount of salt can induce an undesired, salty taste to the cheese. In addition, the method involves treating the cheese curd at relatively low temperatures, not generally exceeding 38 centigrades, and this temperature is not sufficient to support the growth of Lactobacillus strains in order to obtain the full benefit of such bacterial strains.

U.S. Pat. No. 4,851,240 describes the process of increasing yield of cottage cheese curd (acid-set by adding caseinate to milk and heating the milk to 180° F. before forming the curd). A water-origin colloid gum like carrageenan may be also added only for the purpose of increasing the yield. The addition of caseinate, a milk protein and milk extender, to the starting milk resulted in the finished product being an imitation cheese product. Imitation cheese products have reduced consumer acceptance and product marketability.

U.S. Pat. No. 4,749,584 is directed to a method for preparing a low fat cheese base usable as a partial or total replacement for conventional cheese in cheese containing foods (cheese cakes) and not for direct consumption. In this application a stabilizer consisting of guar-gum, locust bean gum and carrageenan and a buffer were added to a finished soft cheese manufactured using acid coagulation and then Pasteurized to obtain a smooth consistency.

Carrageenan has been used in a number of instances to enhance production of cottage cheese and soft acid set coagulated cheeses. These methods have involved the use of carrageenan to tie up protein material from the whey thereby increasing the yield levels. Such methods encompass substantially different functionality for the carrageenan, different pH levels, use of different chemical and biological constituents and different processing parameters, such as different temperatures, compared to the instant invention.

OBJECTS OF THE INVENTION

It is therefore an object of the invention to provide an improved method and article of manufacture of low fat cheese.

It is another object of the invention to provide a new method and article of manufacture of low fat, low cholesterol, low calorie natural cheese.

It is an additional object of the invention to provide an improved method and article of manufacture of a low fat, low cholesterol and low calorie cheese having the flavor and texture of normal natural cheese.

It is a further object of the invention to provide a novel method and article of manufacture of cheese using carrageenan during processing for optimizing the characteristics of a low fat cheese product.

It is yet another object of the invention to provide an improved method and article of manufacture of low fat, low cholesterol cheese using particular varieties of lactic acid producing bacteria for optimizing cheese flavor and texture.

It is still another object of the invention to provide a novel method of manufacture of low fat, low cholesterol cheese using a carrageenan additive to allow increased processing temperature, producing improved cheese flavor and texture.

It is yet an additional object of the invention to provide an improved method of manufacture of a low fat, low cholesterol cheese using a carrageenan stabilizer having high casein reactivity to improve water retention and control water content of intermediate and final cheese products.

It is still a further object of the invention to provide an improved method of manufacture of a low fat cheese using a starting liquid milk having 0.01-0.3% fat and processing the liquid milk with a carrageenan stabilizer and a group of lactic acid producing bacteria.

Additional objects and advantages are set forth in the Detailed Description and Examples.

DETAILED DESCRIPTION OF PREFERRED EMBODIMENTS

According to the one embodiment of this invention the following steps are present in a method of manufacture of cheddar cheese varieties: a basic starting liquid milk was standardized to a low fat content in the range of roughly 0–0.3%, and most preferably about 0.01–0.1%, depending on the type of cheese being manufactured. Typically a commercially available skim milk was used although appropriate composition non-dairy solutions (casein solutions) can also be used as the starting liquid milk. In addition, one can use as the starting liquid milk a dry or condensed skim milk in combination with water or an ultrafiltered (whey removed) skim milk concentrate in dry or liquid form.

In the most preferred embodiment carrageenan is a useful component for processing the milk to obtain the end product low fat, low cholesterol cheese. Carrageenan is a group of galactan polsaccharides extracted from red algae and has an ester content of about 20% or more. Carrageenan is generally a mixture of several polysaccharides, but primarily consists of three components, kappa, lambda, and iota. The amounts of each of these components or phases varies with the source.

In general, the kappa carrageenan phase contains over 34% of 3, 6-anhydro-D-galactose (3, 6-AG) and 25% ester sulfate by weight. A 1.5% by weight concentration in water at 75° C. exhibits a viscosity of roughly 50 mPa. Upon reducing the temperature of a water solution of carrageenan, gelling will occur at a temperature of from about 45° to 65° C., with the gelling temperature and gel firmness depending upon the quantity and types of metallic ions, for example, $K^+$, $Ca^{++}$ and $NH_4^+$, which are present in the solution.

Typically, the lambda carrageenan phase contains approximately 35 wt. % ester sulfate but includes no 3,6-AG. The lambda phase forms a free-flowing solution in water, and lambda carrageenan is a non-gelling entity. The lambda carrageenan phase produces the highest water viscosities. Thus, for a 2.0 wt. % concentration of lambda carrageenan in water, the viscosities are in excess of 600 mPa.

The iota carrageenan phase contains approximately 30% 3,6-AG and 32 wt. % ester sulfate and upon cooling and in the presence of gel-inducing cations, such as $Ca^{++}$, $Mg^{++}$ and $K^+$, the iota carrageenan can form elastic, syneresis-free, thermally-reversible gels at concentrations as low as 0.3 wt. %.

In the conventional manner, the carrageenan phases described above shall be hereafter referred to as carrageenan, with the understanding that reference, for example, to one of the major carrageenan phases does not preclude the presence of at least some of the other two phases, as well as precursors of all the phases.

In an aspect of the invention, carrageenans are used to controllably react with milk casein. Without limitation and without requiring such actual functionality in the claims, it is believed that at certain locations on the surface of the casein micelle there are concentrations of positive charges which can react strongly with the negative charges of the carrageenan. Such a reaction can form a strong matrix responsible for suspending milk casein and decreasing shrinkage of the curd. Regardless of the precise chemical functionality, it has been found from experimentation that the carrageenan allows processing of the cheese curd to proceed in an advantageous manner and achieve a low fat cheese with taste and texture quite similar to typical fat containing cheeses.

The ratio of kappa to iota carrageenans can also be varied and still achieve good quality low fat cheese (see Examples 1 and 7-12). In addition, the kappa to iota ratio can be adjusted according to the type of cheese being manufactured in order to optimize flavor and texture. Illustrations of preferred ratios for different cheeses are set forth in Examples 2-6 provided hereinafter.

The liquid milk is preferably pasteurized at a temperature between about 160°-180° F. and then cooled to about 85°-95° F. The liquid milk is mixed with a stabilizer material, such as, for example, carrageenan with the ratio of kappa to iota carrageenans adjusted as noted above for the particular type of cheese being manufactured. The carrageenan can also be mixed with dry skim milk and even dried whey and then dissolved in water or a volume of liquid milk to obtain the desired liquid milk mixture. In another form of the invention the carrageenan can be added to the milk before, rather than after, pasteurization and still achieve the desirable end product cheese. The amount of carrageenan is preferably less than about 0.1–0.2% by weight since further amounts have no additional beneficial effect. Most preferably the carrageenan is less than about 0.06% by weight.

After the carrageenan has been completely dissolved in the milk solution, a cheese formulation solution is prepared by adding the following preferred cheese cultures to the milk/carrageenan solution: *Streptococcus lactis, Streptococcus cremoris, Streptococeus thermophilus, Lactobacillus helveticus, Lactobacillus bulgaricus, and Lactobacillus casei.* Pure strains of these bacteria cultures can be obtained commercially. For example, *Lactobacillus casei, L. helveticus* and *L. bulgaricus* can be obtained from Chris Hansens Labs, Milwaukee, Wisconsin; and Streptococcus thermophilus, *S. lactis* and *S. cremoris* can be obtained from Institute Rosell, Inc., Montreal, Canada. After adding these cheese cultures, the resulting cheese formulation solution is stirred. This most preferred group of cheese cultures was found to provide good acid production and flavor development along with good texture improvement. This cheese culture group also enhances flavor development during ripening or maturing of the low fat cheese and also removes bitterness normally present in low fat cheeses produced by different methods.

In another form of the invention, the carrageenan can be premixed with the above cited cultures to form a starter or mother culture which can be added to the liquid milk after pasteurization. One can also choose to incubate the premixture for 12-15 hours to grow the culture and then add the incubated mixture to the liquid milk.

The cheese formulation solution is kept at temperatures from about 85°-95° F., and slow agitation was provided for about an hour. This processing time allows for solubilization of the carrageenans, enables a desirable reaction to take place between casein and the carrageenan; and a slight acid development occurs in the cheese formulation solution (although the pH of the solution of about 6.5 does not change perceptibly). The next step is the addition of approximately 0.01 to 0.02 wt. % calcium chloride and rennet (or other conventional clotting enzyme substitute) in the amount of about 2-4 oz. (0.0125-0.025 wt. %) per thousand pounds of milk and then agitation is ceased. The pH is still about 6.5. After about twenty to thirty minutes processing time and/or when the milk is substantially coagulated, the curd is cut in a conventional manner into small sections between about ¼ to ½ inch in both directions. This step increases the surface area of the curd, enhancing whey expulsion and improving heat distribution.

The curd is then left without stirring for about fifteen minutes, and the curd is stirred slowly with the temperature raised gradually to between about 100°-116° F. Stirring at this high temperature continued until the preferred, preselected pH range of the curd is reached, about 5.3-6.1 and most preferably about 5.6-5.9. This high temperature of about 100°-116° F. allows enhanced bacterial growth resulting in substantially improved cheese flavor and texture properties. The curd is allowed to settle, and then the whey is completely drained from the vat. Cold water is added (at about 45°-70° F.), and the amount of cold water used is roughly equivalent to ⅓ to ½ the amount of whey drained from the vat. The curd is then stirred and washed for about ten to thirty minutes. This washing step removes the lactic acid which had developed in processing and also removes the remaining lactose sugar. In addition, the use of cold water will slow the fermentation and help obtain a preselected pH value in a range which enhances the final flavor and texture of the cheese. The water also acts as a buffering solution to reduce acid development and prevent the pH of the curd from falling below a lower limit of about 5.1 (the minimum pH is normally achieved after about two to three weeks of curing). The curd is then allowed to settle, and the cold water is drained from the vat.

The carrageenan allows controlled water absorption in the curd which will allow achieving the desired firmness or texture of the finished cheese product. Dry salt is added to the cheese curd product using about one to three percent of the curd weight, and then the product is hooped and pressed or hooped and salted by immersion in brine. The finished cheese can be either packed in plastic film or waxed then cured until it achieves the desired characteristics. As mentioned above, typically, the cheese slowly reduces in pH, for example, from 5.6 to 5.3 due to bacterial fermentation of residual lactose present in small amounts of whey left in the cheese.

In another form of the invention dairy flavors can be added initially to the milk, before or after pasteurization, but before further processing. The addition of such flavor additives at such an early stage in cheese manufacture leads to unexpected enhanced flavor development in the end product. These other inventions are set forth in a separate copending and incorporated patent application having the same inventor.

As mentioned hereinbefore, various ratios of kappa to iota carrageenan can be used to produce a low fat cheese. In particular, optimum flavor and texture are obtained by varying the carrageenan phase ratios depending on the type of cheese being manufactured. Nevertheless, for any of the cheese described herein, good quality cheese flavor and texture was obtained for at least the range of kappa and iota carrageenans set forth in Examples 1 and 7-10.

Such additions of carrageenan can also be made before and/or after pasteurization. The carrageenan can thus perform functionally as a fat replacement, allowing the manufacturing process to proceed as if normal cheese were being produced (as characterized in terms of cutting, cooking and pressing). The carrageenan also controllably restores moisture during pressing and further controls the cheese body firmness during ripening. The resulting low fat cheese exhibits good cutting and slicing properties quite similar to conventional fat cheeses, such as Cheddar cheese.

The following nonlimiting examples illustrate preparation of a range of different low fat cheeses The basic inventions can however be practiced by one of ordinary skill in the art to manufacture any selected type of conventional cheese by using the components and methods set forth in the specification and Examples as modified to achieve the selected cheese flavor and texture but without substantial fat. For example, as understood by one of ordinary skill in the art, the proper cheese culture must be used and the carrageenan phase ratios merely optimized for the particular cheese variety.

EXAMPLE 1

A low fat natural Cheddar cheese was manufactured using the following procedure. To 1,000 pounds of conventional pasteurized skim milk, containing 0.04% fat, the following was added: 0.2 pounds of kappa carrageenan, 0.4 pounds of iota carrageenan and optionally 2.0 pounds of conventional cheese flavorant. Further additions are about half an ounce of conventional annato color (diluted in water), ten pounds of cultures containing roughly equal portions of *Streptococcus cremoris, Streptococcus lactis, Streptococcus thermophilus, Lactobacillus helveticus, Lactobacillus bulgaricus* and *Lactobacillus casei.* The skim milk was kept at about 90° F. for one hour with slow agitation. After one hour of slow agitation, about 0.1-0.2 pounds calcium chloride was added (dissolved in 2 pounds water) and 0.2 pounds of rennet (diluted with 4 pounds of water) was added to the skim milk, and stirring was stopped. After about twenty to thirty minutes time, the skim milk has substantially coagulated to a curd. This curd was gently cut in both directions using ½ inch knives, and the curd was left to heal for fifteen minutes. The curd was stirred slowly, and the temperature was gradually raised to 106° F. and held until the PH of the curd reached 5.9. Stirring was then stopped, and the curd was allowed to settle, and the whey was drained. Four hundred fifty pounds of cold water (45° F.) was added, the resulting liquid solution was at a temperature of about 75°-85° F. and the curd was stirred slowly for thirty minutes. Addition of this cold water slows down the reaction rate. Stirring was stopped, the curd was allowed to settle; and the cold water was then drained off. The curd was washed to obtain a pH of approximately 5.8 before pressing so the final pH of the product after about three weeks was between about 5.3-5.5. Three pounds of dry salt was mixed in the curd, and the curd was hooped and pressed until a firm body was obtained. This curd is a precursor to a final cheese product which was packaged in plastic film and cured at 38° F. for about two to three months. The final moisture or water content in the cheese was about 53-57% and the salt in the cheese is about 1 to 1½.

In this example it should be noted that various ions, such as, potassium, ammonium and magnesium, can be added to the milk to further control or adjust the firmness of the finished cheese. Such additions affect the carrageenan reactivity and allow firming of curd texture as more of the enumerated ions are added. Other gums and casein stabilizers can also be added along with the carrageenans, or alternatively added to the milk before pasteurization. It should be noted that in the total absence of carrageenans, or if the ratio between kappa and iota carrageenans is altered drastically from the range of Examples 1 and 7-12, the body of the resulting cheese after ripening can be very rubbery or pasty and the flavor undesirable.

EXAMPLE 2

Natural mozzarella cheese was manufactured using the following procedure. To 1,000 pounds pasteurized skim milk containing 0.04% fat the following was added: 0.3 pounds kappa carrageenans, 0.1 pounds of iota carrageenan, 10 pounds of the cultures used in Example 1 and a conventional cheese flavorant for mozzarella cheese. The procedure under Example 1 was followed with the following modifications: no colorant was added, and the whey was drained when the pH reached 5.3 in the curd. Five pounds of dry salt was mixed with the curd, and the mixture was stirred for twenty minutes. Three hundred pounds of cold water (45° F.) was added to the vat, the curd was stirred for twenty minutes and the water was drained. In a conventional manner of treating full fat mozzarella cheese, the cheese was stretched, salted in a brine and cooled and packaged in a plastic film. The final water content of the cheese was about 53-57%.

EXAMPLE 3

A Swiss cheese was manufactured using the procedure of Example 1 with the following modifications: No colorant was added and, in addition to the culture used in Example 1, a frozen propionic bacteria culture was added to the liquid milk in the amount of twenty-five grams. About 1.8 pounds of dry salt was added to the curd, and after pressing the cheese, it was vacuum packaged and placed in cold storage at 35°-40° F. for about twenty-four hours. The cheese was then placed in a room at a temperature of about 70° F. until the desired lacy type openings were formed (which usually appear in about 15-20 days). The cheese was returned to cold storage at about 35°-40° F. until ready for sale and consumption. The moisture content in the final cheese was about 53-57%.

EXAMPLE 4

Low fat natural blue cheese was manufactured using the procedure described in Example 1 with the following modifications. No colorant was added, the whey was drained at a pH of 5.5, no washing step occurred, and 2.4 pounds salt was mixed with one ounce of penicillium roquefortii spores and uniformly added to the curd. In addition, conventional blue cheese molds were used, the blue cheese wheel was salted for 5 days and then waxed, and air holes were needled as in the case of conventional blue cheese. The cheese was then cured at 50° F. and 95% relative humidity for sixty to ninety days. The moisture or water content in the finished cheese was about 55%.

EXAMPLE 5

Low fat Camembert cheese was manufactured in the manner of Example 4 with the following modifications: About 2.4 pounds of salt was added to the curd, and the curd was ladled into conventional round molds for Camembert cheese. Spores of penicillium camembertii or penicillium caseicolum were sprayed on the surface of the cheese wheels, and ripening took place at 50° F. and 95% relative humidity for two weeks until the cheese reached maturity. The cheese was wrapped and stored in preparation for sale and consumption. The water or moisture content in the final cheese was about 55%.

EXAMPLE 6

Gouda type cheese was manufactured according to the procedure used in Example 1 with the following modification: A 0.1% culture of *Streptococcus lactis diacetylactis* was added to the cultures used in Example 1. The moisture content was about 53-57% in the final Gouda cheese.

EXAMPLE 7

A low fat Cheddar cheese was manufactured in the manner of Example 1 but with a kappa carrageenan component of 0.1 pounds and an iota carrageenan component of 0.2 pounds. The resulting low fat Cheddar cheese had substantially the same high quality and moisture content as in Example 1.

EXAMPLE 8

A low fat Cheddar cheese was manufactured in the manner of Example 1 but with a kappa carrageenan component of 0.2 pounds and an iota carrageenan component of 0.2 pounds. The resulting low fat Cheddar cheese had substantially the same high quality and moisture content as in Example 1.

EXAMPLE 9

A low fat Cheddar cheese was manufactured in the manner of Example 1 but with a kappa carrageenan component of 0.3 pounds and an iota carrageenan component of 0.2 pounds. The resulting low fat Cheddar cheese had substantially the same high quality and moisture content as in Example 1.

EXAMPLE 10

A low fat Cheddar cheese was manufactured in the manner of Example 1 but with a kappa carrageenan component of 0.5 pounds and an iota carrageenan component of 0.5 pounds. The resulting low fat Cheddar cheese had substantially the same high quality and moisture content as in Example 1.

EXAMPLE 11

Parmesan type cheese was manufactured according to the procedure used in Example 1 with the following modifications: No color was added, 0.1 pound of kappa carrageenan and 0.5 pounds of iota carrageenan were utilized, the whey was drained at a pH of 5.3. The cheese was further pressed in the same manner as conventional Parmesan cheese. The final water or moisture content was roughly 48-51%.

EXAMPLE 12

Low fat natural Romano style cheese was manufactured using the procedure described in Example 11 with the following modifications: 0.3 pounds of kappa carrageenan and 0.3 pounds of iota carrageenan were utilized. The cheese was further processed in the same manner as conventional Romano cheese and had a moisture content of about 50%.

While the present invention has been described with reference to specific embodiments thereof, it will be understood that numerous modifications may be made by those skilled in the art without actually departing from the scope of the planned invention. Accordingly, modifications and equivalents can be contemplated to fall within the scope of the invention as claimed hereinafter.

I claim:

1. A method of manufacture of low fat cheese comprising the steps of:
   (a) preparing a starting liquid milk having a fat content of about 0% to 0.3%;
   (b) mixing and dissolving a carrageenan with said starting liquid milk;
   (c) adding a lactic acid producing culture to said starting liquid milk and said dissolved carrageenan thereby forming a cheese formulation solution;
   (d) processing said cheese formulation solution by reacting clotting enzyme means with said cheese formulation solution and coagulating said solution to form a curd and a whey solution;
   (e) cutting said curd thereby increasing surface area of said curd, raising the temperature of said curd and said whey solution to cook said curd at less than about 49° C. and achieving a pH in the range of about 5.1–6.1 for said curd in said whey solution;
   (f) separating said whey solution from said curd and controlling the water in contact with said curd by adding water thereto for controlling pH; and then
   (g) separating said water from said curd and ripening said curd to form said low fat cheese having a fat content arising from the fat content present in said starting liquid milk.

2. The method as defined in claim 1 wherein step (d) comprises adding rennet to said cheese formulation solution.

3. The method as defined in claim 1 wherein said step (f) includes preventing said pH from falling below about 5.1 after adding said water.

4. The method as defined in claim 1 wherein said carrageenan comprises about 0.01–0.2% by weight of said starting liquid milk.

5. The method as defined in claim 1 wherein said carrageenan comprises a ratio of kappa and iota carrageenan of about 3:1 to 1:5.

6. The method as defined in claim 5 further including the step of preparing a carrageenan mixture having said ratio of carrageenan predetermined in order to produce an optimum end product cheese selected from the group consisting of Cheddar cheese, Colby cheese, mozzarella cheese, Jack cheese, Muenster cheese, Gouda cheese, Swiss cheese, blue cheese, Romano cheese, Parmesan cheese and Camembert cheese.

7. The method as defined in claim 1 further including a step of pasteurizing said starting liquid milk and wherein said carrageenan is dissolved in said starting liquid milk before and/or after pasteurization of said liquid milk.

8. The method as defined in claim 1 wherein said culture is selected from the group consisting of *Streptococcus thermophilus, Lactobacillus helveticus, Lactobacillus bulgaricus Lactobacillus casei Streptococcus lactis* and *Streptococcus cremoris.*

9. The method as defined in claim 1 wherein said step (f) comprises the steps of draining the whey solution from said curd, and adding cold water at a temperature of about 45°–70° F. in an amount of about ⅛ to 1/78 the amount of said drained whey solution.

10. The method as defined in claim 1 further including the additional step of adding a dairy flavor to said starting liquid milk.

11. The method as defined in claim 10 further including the step of pasteurizing said starting liquid milk and wherein said dairy flavor is added before and/or after pasteurization of the milk and before further processing.

12. A method of manufacture of low fat cheese, comprising the steps of:
   (a) preparing a starting liquid milk having a fat content of about 0% to 0.3%;
   (b) mixing and dissolving carrageenan material with said starting liquid milk;
   (c) preparing a cheese formulation solution by adding a lactic acid producing cheese culture to said starting liquid milk and said dissolved carrageenan;
   (d) processing said cheese formulation solution by coagulating said cheese formulation solution using clotting enzyme means added to said cheese formulation solution and forming a curd and a whey solution;
   (e) cutting said curd thereby increasing the surface area of said curd and cooking said curd in said whey solution at temperatures of less than about 49° C.
   (f) separating said whey solution from said curd; and then
   (g) ripening said curd to form said low fat cheese having a fat content arising from the fat content present in said starting liquid milk.

13. The method as defined in claim 12 wherein said carrageenan comprises a mixture of kappa and iota carrageenan ranging from a ratio of about 3:1 to 1:5 of kappa to iota carrageenan to optimize cheese flavor and texture for the particular type of cheese.

14. The method as defined in claim 12 wherein said step (f) includes preventing the pH of said curd from falling below about 5.1.

15. The method as defined in claim 12 wherein the fat content in said low fat cheese is at most about 3.6%.

16. The method as defined in claim 12 wherein said carrageenan comprises about 0.01 to about 0.2% by weight of said starting liquid milk.

17. The method as defined in claim 12 wherein said step (e) further includes maintaining pH of said curd of about 5.1–6.1.

18. A method of manufacture of low fat cheese comprising the steps of:
   (a) preparing a starting liquid milk having a fat content of about 0% to 0.3%;
   (b) mixing and dissolving a carrageenan into said starting liquid milk;
   (c) adding a selected lactic acid producing culture to said starting liquid milk and said dissolved carrageenan thereby forming a cheese formulation solution;
   (d) reacting clotting enzyme means with said cheese formulation solution to form a coagulated curd and a whey solution;
   (e) breaking open said curd to increase the surface area and of said curd, raising the temperature of said curd and said whey solution to cook said curd at a temperature less than about 49° C. and achieving a pH in the range of about 5.1–6.1 for said curd in said whey solution; and then
   (f) separating said whey solution from said curd and ripening said curd to form said low fat cheese having a fat content arising from the fat content in said starting liquid milk.

19. The method as defined in claim 18 wherein the fat content of said cheese is about 0–3.6%.

20. A method of manufacture of low fat cheese selected from the group consisting of Camembert and blue cheese, comprising the steps of:
   (a) preparing a starting liquid milk having a fat content of about 0-0.3%;
   (b) mixing and dissolving a carrageenan into said starting liquid milk;
   (c) adding a selected lactic acid producing culture to said starting liquid milk and said dissolved carrageenan thereby forming a cheese formulation solution;
   (d) reacting clotting enzyme means with said cheese formulation solution to form a coagulated curd mass and a whey solution;
   (e) breaking open said curd means to increase the surface area of said curd in contact with said whey solution, cooking said curd in said whey solution at about 38°-49° C. and achieving a pH in the range of about 5.3-6.1 for said curd in said whey solution;
   (f) separating said whey solution from said curd; and then
   (g) adding a penicillin spore to said curd and curing said curd to form said low fat cheese having a fat content arising from the fat content in said starting liquid milk.

21. A method of manufacturing a low fat cheese selected from the group consisting of Mozzarella, Parmesan and Romano cheese, comprising the steps of:
   (a) preparing a starting liquid milk having a fat content of about 0-0.3%;
   (b) mixing and dissolving a carrageenan into said starting liquid milk;
   (c) adding a selected lactic acid producing culture to said starting liquid milk and said dissolved carrageenan thereby forming a cheese formulation solution;
   (d) reacting clotting enzyme means with said cheese formulation solution to form a coagulated curd mass and a whey solution;
   (e) opening up said curd mass to increase the surface area of said curd in contact with said whey solution, raising the temperature of said curd and said whey solution to about 100°-116° F. and achieving a pH in the range of about 5.1-5.5 for said curd in said whey solution;
   (f) separating said whey solution from said curd and adding water to said curd for controlling pH; and then
   (g) separating said water from said curd and ripening said curd to form said low fat cheese having a fat content arising from the fat content in said starting liquid milk.

* * * * *